United States Patent [19]

Trowland

[11] Patent Number: 5,067,774
[45] Date of Patent: Nov. 26, 1991

[54] CONE SHAPED INFLATABLE BAG FOR LIFTING A LOAD

[75] Inventor: Mark G. Trowland, Buranda, Australia

[73] Assignee: Marketmont Pty, Ltd., Queensland, Australia

[21] Appl. No.: 493,550

[22] Filed: Mar. 14, 1990

[30] Foreign Application Priority Data

Mar. 17, 1989 [AU] Australia ............... PJ3265

[51] Int. Cl.$^5$ ............ B60P 1/16; B66F 3/35
[52] U.S. Cl. ............ 298/1 A; 254/93 H P; 298/10; 298/22 R; 298/22 D; 414/469; 414/917
[58] Field of Search ............ 414/469, 917, 678; 298/1 A, 1 H, 22 R, 22 F; 254/93 R, 93 HP

[56] References Cited

U.S. PATENT DOCUMENTS

| 2,644,449 | 7/1953 | Champagne | 254/93 HP |
| 3,324,917 | 6/1967 | Schirtzinger | 383/908 |
| 3,510,142 | 5/1970 | Erke | 383/3 |
| 3,659,899 | 5/1972 | Phillips et al. | 298/1 A X |
| 3,784,255 | 1/1974 | Smock | 298/22 R |
| 4,503,558 | 3/1985 | Lief et al. | 383/3 |
| 4,572,579 | 2/1986 | Saito | 298/1 A |
| 4,762,298 | 8/1988 | Wood | 254/93 HP X |

FOREIGN PATENT DOCUMENTS

| 579830 | 1/1985 | Australia | 298/1 A |
| 588734 | 1/1989 | Australia | 298/1 A |
| 567378 | 2/1945 | United Kingdom | 383/3 |

Primary Examiner—David A. Bucci
Assistant Examiner—Brian K. Dinicola
Attorney, Agent, or Firm—Helfgott & Karas

[57] ABSTRACT

An inflatable bag (17) for use in exhaust powered tippers is constructed from blanks of flexible air tight material using a side wall template (10) and end wall templates (11, 12). The blanks are made so that the finished bag when fully inflated assumes an oblique cone-like shape (17) with rounded ends (19, 20). The side wall material is preferably a fabric having waft and weft fibres of uniform tensile strength so that the tension in the side wall is in the longitudinal direction as the bag inflates in order to reduce the tendency of the bag to rotate on its couplings. The invention can be provided in kit form where the bag is coupled for limited movement to load transmitting end plate (21, 22) for retro fitting the bag to a vehicle.

10 Claims, 4 Drawing Sheets

CONE SHAPED INFLATABLE BAG FOR LIFTING A LOAD

FIELD OF INVENTION

THIS INVENTION relates to an inflatable bag suitable for use as lifting means for a tiltable body in particular but not limited to vehicle dump boxes.

BACKGROUND OF INVENTION

Australian Patent No. 579,830 to Trowland describes a tipping apparatus having an arrangement for tipping the box body of a trailer with respect to its chassis. An inflatable bag is inflated to tilt the box body by coupling the bag to the exhaust pipe of the towing vehicle. The inflatable bag is substantially cylindrical and has its ends mounted to the box body and the chassis via upper and lower load transmitting end plates. The bag is made from blanks of flexible material joined by seams and has its ends fixed to the end plates via tabs joined to the bag and having their free ends stapled or otherwise secured to the end plates.

While this bag is relatively simple to construct and can be easily mounted to the box and chassis, stresses created during inflation are unevenly distributed causing excessive stress at the seams of the bag. This shortens the life of the bag. In addition, on deflation the bag tends to fold in a disorderly manner and can in parts extend beyond the edges of the load transmitting plates. Chafing of the protruding parts of the bag can occur thereby shortening the life of the bag.

Another problem with this bag is that as a consequence of the fitting arrangement, that is via tabs at each end of the bag, there is a tendency for the bag to rotate on the plates and this can break the tab joins and reduce the life of the bag.

A still further problem is that for conventional vehicles such as pick ups, utility trucks and trailers, in order to achieve a useful tipping angle, of say 50°, with the Trowland bag it is necessary to make the bag excessively large.

In Australian Patent Application No. 18662/88 to Beer there is disclosed an incline lift assembly where Beer has specifically set out to overcome the disadvantages of the Trowland arrangement. In order to provide a bag which deflates in an orderly manner the bag according to Beer has when inflated, a cross-section which diminishes in one direction so that the narrowest portion of the bag deflates within the periphery of the broadest portion. Unfortunately, all the Beer proposals sacrifice the simplicity of the Trowland bag in order to overcome the abovementioned problems. Each of the Beer bag arrangements are complex and expensive.

In order to lift to high angles the Beer proposal includes a complicated arrangement of hinges and scissor struts in order to maintain the end plates parallel while the tip box is hinged to the rear end of the upper end plate. This arrangement necessarily reduces the amount of force that can be applied directly to a load.

U.S. Pat. No. 4,572,579 to Saito describes a dump apparatus having a bag which is substantially trapezoidal in shape when inflated. The bag is mounted to end plates and is confined when inflated by flexible strut members in order to prevent excessive lateral inflation of the bag. The struts also assist in distributing stress and thereby concentrating the inflation in the forward and rear direction rather than laterally. In order to achieve high tipping angles with this arrangement it is necessary to hinge the tip box to the rearward end of the upper plate so that the plates remain parallel during inflation. As for the similar arrangement of Beer this necessarily reduces the amount of force that can be applied to the load.

It is therefore a principal object of the present invention to overcome or at least alleviate some of the problems associated with the aforementioned prior art.

SUMMARY OF THE INVENTION

In one aspect therefore, the present invention resides in the combination of a dump tray, an inflatable bag and a base suitable for a dump vehicle, hinge means connecting the dump tray to the base to constrain the tray's movement, the inflatable bag being coupled to the tray and to the base and being located between the tray and the base, such that on inflation of the bag, the base remains stationary relative to the tray and the tray is moved about the hinge means, the bag when fully inflated being elongate and tapered in a direction toward the tray, the arrangement being that during inflation the vector representing the resultant force delivered by the bag to the tray rotates toward the hinge means.

In another aspect, the invention resides in an inflatable bag for lifting a load, the bag including a side wall between end walls which travel apart as the bag inflates, the bag when fully inflated being elongate and tapered in a direction toward one of the end walls, the side wall being made from a material having reinforcement extending in two directions such that during inflation, the resultant tension in the material in said side wall, in the direction between the end walls, is substantially in the direction of travel of said end walls.

In a further aspect, the invention resides in a kit for fitting a vehicle chassis with an exhaust powered dump tray, the dump tray being hingedly connected to the chassis, the kit including an inflatable bag and load transmitting end plates, the inflatable bag having a side wall and opposed end walls and when inflated assumes an elongate and tapered shape, the load transmitting end plates being adapted to secure the bag between the dump tray and the chassis of the vehicle, such that when the bag is fitted and inflated, the dump tray is raised and the bag assumes a shape which tapers toward the dump tray.

In a still further aspect, the invention resides in a method of constructing an inflatable bag having a side wall and opposed end walls and being suitable for lifting a load, the method including forming from flexible sheet material a side wall blank and two end wall blanks, the side wall blank when laid out flat, having opposed neck sections and opposed arcuate seam defining portions defining a medially bulged region between the opposed neck sections, each end wall blank having oval seam defining portions when laid out flat, forming the bag from the blanks by making a longitudinal seam to join the neck sections of the side wall together and by making circumferential seams to join the respective seam defining portions of said side wall to the respective seam defining portions of the respective end walls. Advantageously, the seams are formed by welding overlapping marginal edge portions of the blanks together.

When inflated, the bag can be of any desired shape such as generally cone shaped, frusto-conical, pyramidal or it can be other tapered shapes. Preferably however, the bag assumes an oblique cone-like shape with rounded ends.

The side wall can be made from a fibre reinforced plastics, PVC or other fibre reinforced material. Where the fibres are formed as a fabric, the fibres can be of uniform or non-uniform tonsile strength so that their resultant tension during inflation and deflation of the bag is substantially in the direction of travel of the end walls. It is preferable to employ a fabric having at least two sets of fibres—each set having substantially parallel fibres. In this embodiment, the fibres of one set extend at an angle to the fibres of the other set such that the resultant tension is between the direction along which the fibres extend. Where the fibres are all of substantially equal tensile strength, the fibres of each set preferably are arranged to extend at approximately the same angle to the desired direction of resultant tension.

When the bag is coupled to the base, it is preferably coupled to allow limited movement of the bag relative to the base as the bag inflates. In this way, the vector representing the resultant force delivered by the bag to the tray rotates toward the hinge means.

In order that the invention can be more readily understood and be put into practical effect, reference will now be made to the accompanying drawings and wherein:

DESCRIPTION OF THE PREFERRED EMBODIMENT

Figure 1:
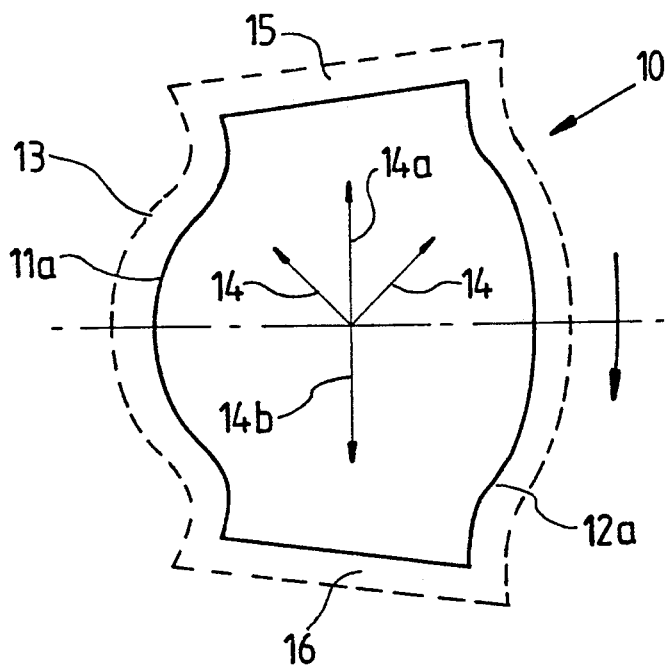
FIGS. 1 to 3 illustrate templates (and blanks in phantom) from which a preferred bag according to the invention can be constructed.
Figure 2:
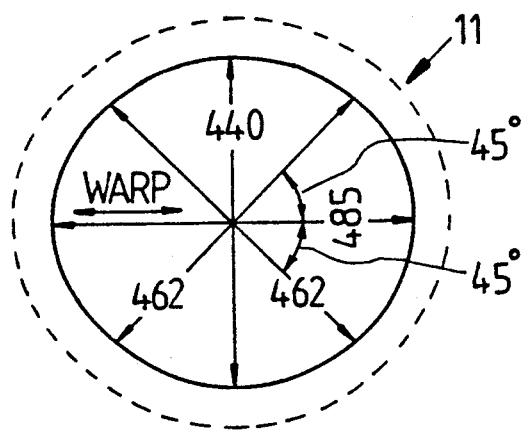
Figure 3:
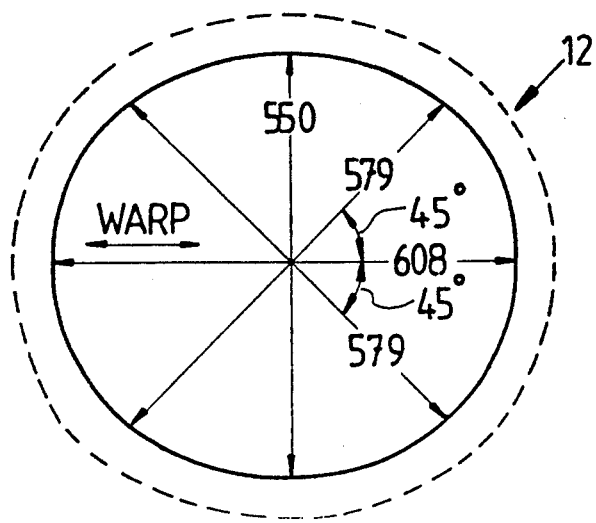

Referring to FIG. 1, there is illustrated in reduced scale a template 10 from which a side wall blank of flexible material and hence, the side wall of an inflatable bag can be constructed, FIGS. 2 and 3 are templates 11 and 12 from which respective end wall blanks and hence, end walls of the bag can be made. In FIGS. 1 to 3 the dimensions shown are in millimeters. The end walls are joined to the side wall during construction of the bag as explained below.

The material to be cut to form the blanks using the templates of FIGS. 1 to 3 can be any suitable commercially available reinforced air tight material such as polyester reinforced PVC. Material known under the trade names COMPLAS, ATLAS and PLASTYNE are suitable; however tests on the ATLAS and COMPLAS material indicate that the sets of fibres have different tensile strength and while these materials can be used the preferred material is PLASTYNE. In PLASTYNE material the fibres have substantially uniform tensile strength and the sets of fibres are set at 90° to each other.

For PLASTYNE material the direction at which the fibres are positioned to extend across the side wall template before the material is cut to form the blank is shown by the arrows 14 in FIG. 1. Thus, the resultant tension is in the direction of arrows 14a and 14b. A margin of 50 mm (shown in phantom) is left about the template to account for the overlapping joins from which the seams of the bag are made. Hence, the blank in each case includes a 50 mm margin when compared to the template.

The marginal edge portions 15 and 16 of a side wall blank constructed using template 10 can be joined using a suitable welding technique. The end wall blanks are similarly cut using templates 11 and 12 with a 50 mm margin (shown in phantom) and are welded to the side wall blank at marginal edges corresponding to edges 11a and 12a of side wall blank respectively. Thus, the blanks of material are actually cut to the shapes given in phantom in FIGS. 1 to 3.

Figure 4:
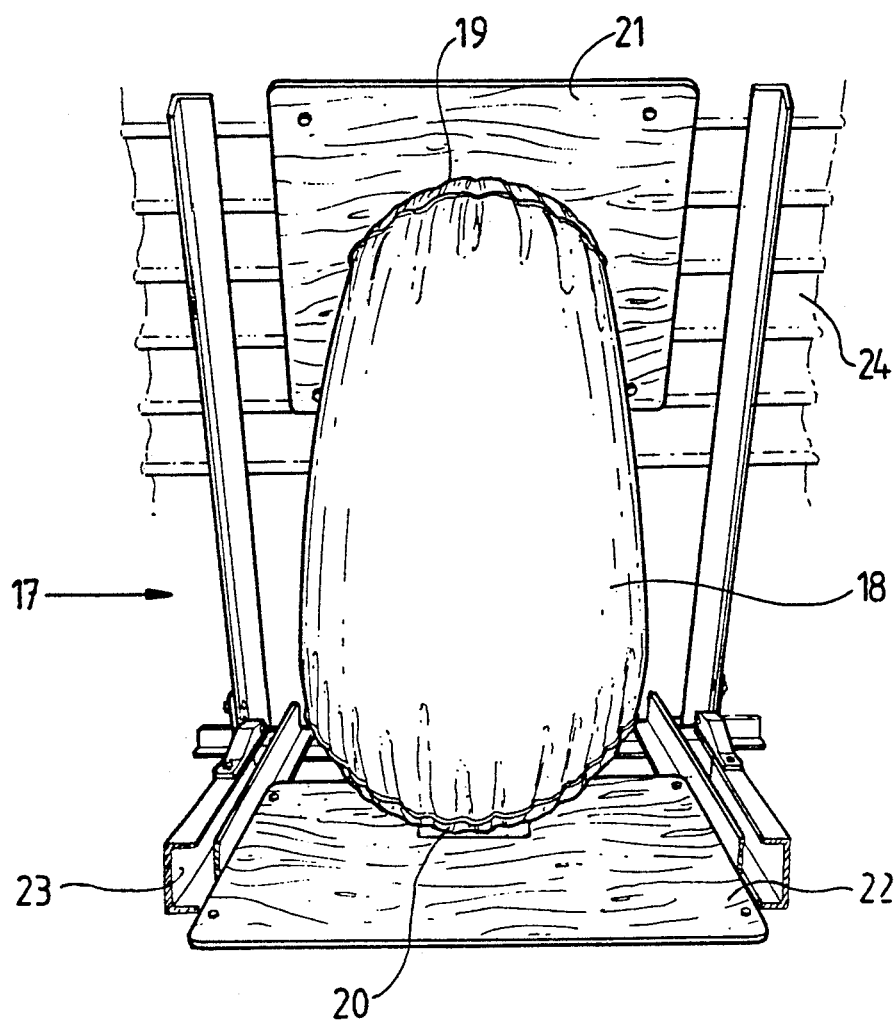
FIG. 4 and FIG. 5 are respective front and side views illustrating a bag according to the invention constructed using the templates of FIGS. 1 to 3.
Figure 5:
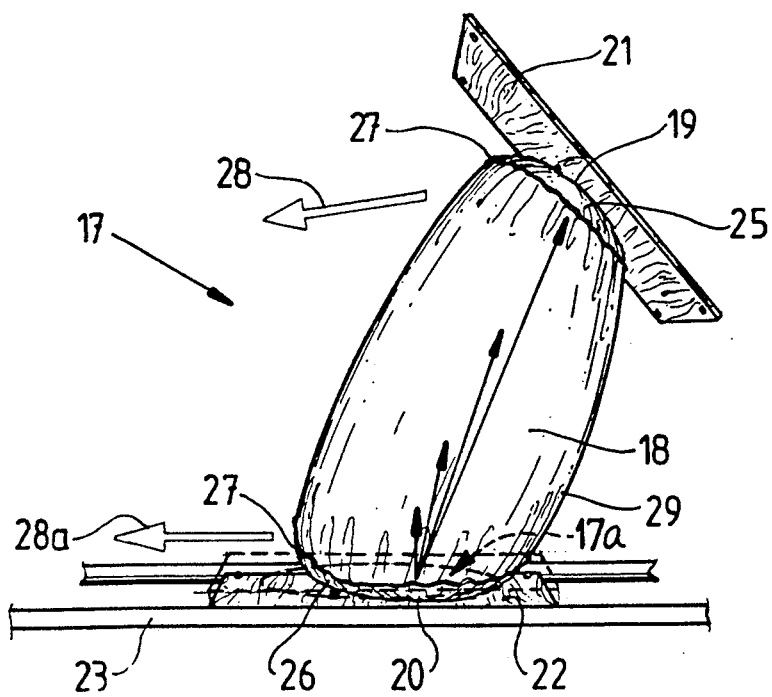
Figure 10:
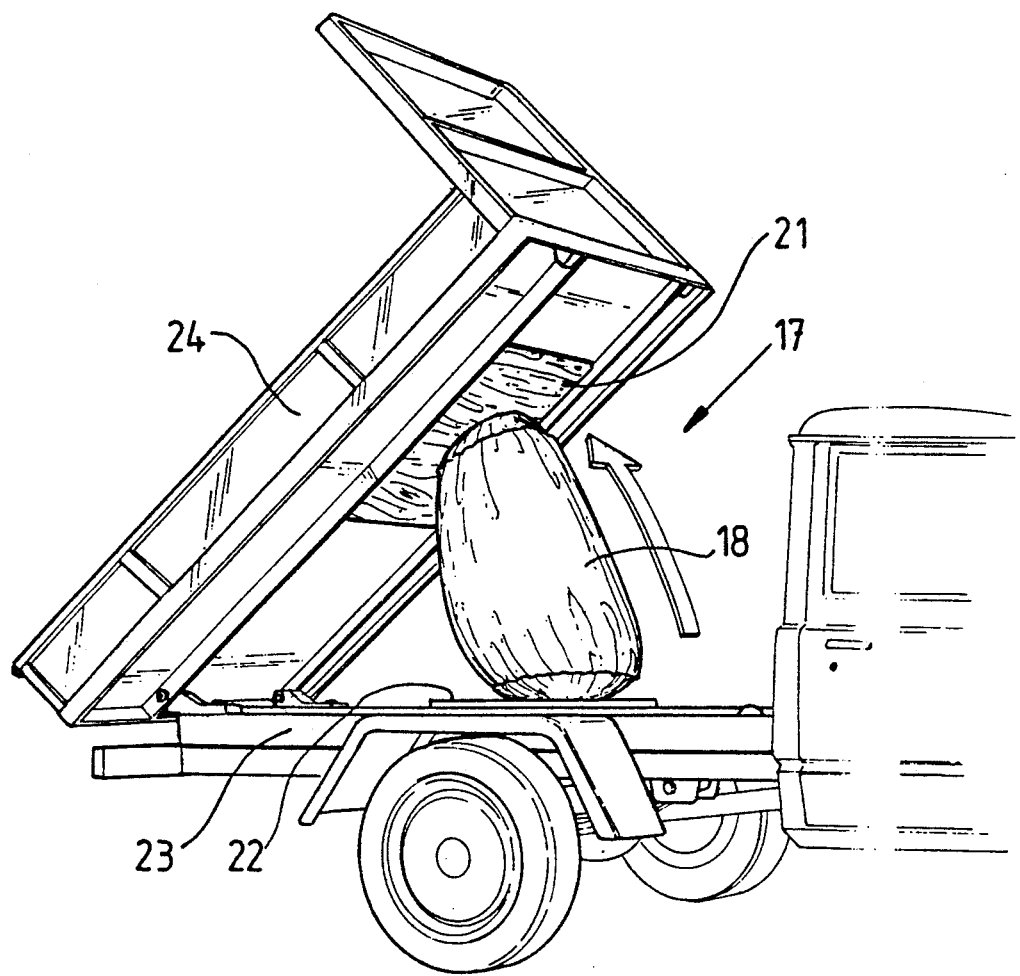
FIG. 10 illustrates the bag of FIGS. 4 to 9 as applied to a tipping vehicle.

On inflation, the bag assumes the oblique cone-like shape with rounded ends as shown in FIGS. 4, 5 and 10. Referring to these figures, the inflated bag 17 comprises a continuous side wall 18 extending between spaced end walls comprising a flexible apical wall 19 and a base wall 20 which are arcuate and in this embodiment are rounded end walls. The bag is shown fixed to plywood load transmitting end plates 21 and 22 (which are usually provided with the bag as a kit) but the end walls of the bag may be fixed directly to the chassis 23 and tip box 24 if desired. The end plates 21 and 22, the chassis 23 and tip box 24 only serve to illustrate one application of the present invention. The templates as illustrated can be scaled up or scaled down depending on the required load and application and with minor modifications, bags can be designed using the principles of the invention to serve a range of lifting applications.

Figure 6:
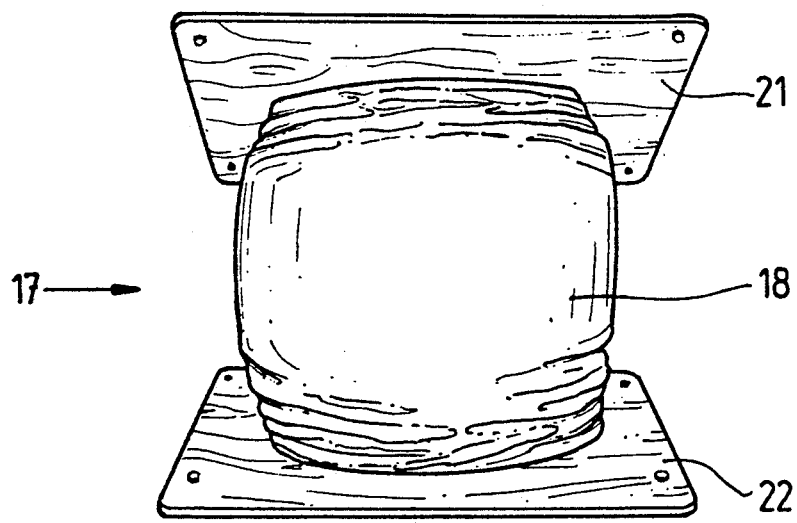
FIGS. 6 to 9 illustrate further aspects of the bag of FIGS. 4 and 5.
Figure 7:
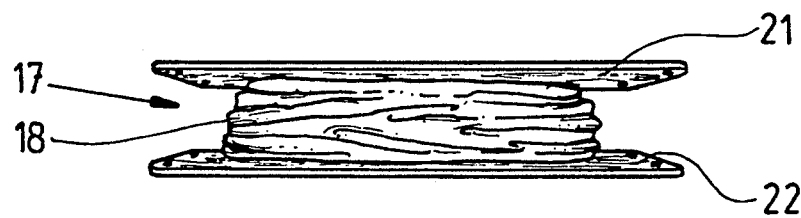

Referring to FIGS. 5 to 7, the deflation of the bag will be considered. As can be seen in FIG. 5, the bag is fully inflated and the upper and lower seams 25 and 26 have adjacent folds 27 which illustrate the effect of tension on the seams between the side wall and the end walls. The bag in a deflated position is shown in dotted lines as designated at 17a in FIG. 5. The folds 27 are of equal size and are evenly distributed about the seam and each fold extends in the direction of travel of the end walls. These folds indicate that the tension in the side wall 18 between the load engaging surfaces is substantially in the direction of travel of the end walls and is evenly distributed along the seam. On inflation and deflation, the bag tends not to rotate.

As the bag deflates, the apical wall 19 will move in the direction of arrow 28 while the lower front portion 29 of the bag will tend to bulb forwardly in an even fashion while the base wall 20 rolls in the direction of arrow 28a on the plate 22. As the tension is even, the bulbing action at portion 29 will also be even and bag will begin to fold inwardly about the periphery as seen in FIGS. 6 and 7 where the bag is illustrated partially deflated and where like numerals illustrate like features.

The bag is preferably mounted to the end plate 22 using tabs which are loosely fitted to enable the base wall 20 to roll on the end plate 22 as the bag inflates or deflates. The vector representing the resultant force applied to the tray by the bag is shown in FIG. 5 as a progressively increasing arrow representing different stages of inflation. As can be seen, the vector rotates rearwardly rather than remaining vertical. Thus, as the bag inflates, force is applied more directly to the load and therefore enables a greater tipping angle to be achieved with a reduced bag capacity and a simple bag construction.

Figure 8:
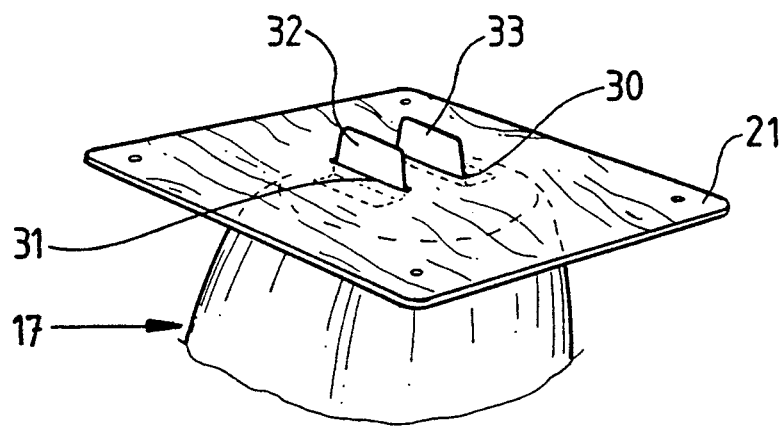
Figure 9:
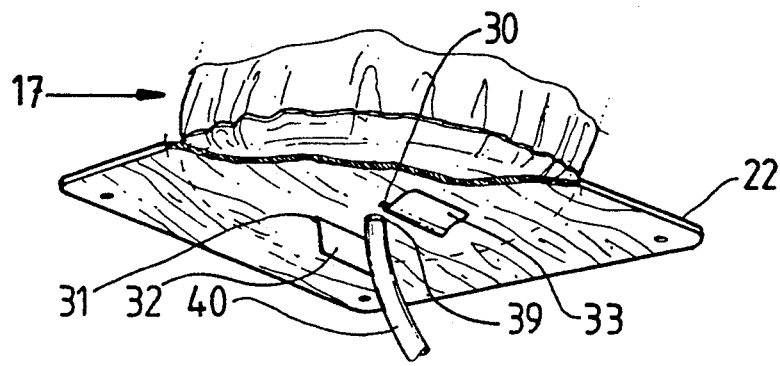

As shown in FIGS. 8 and 9, the end plates 21 and 22 include spaced slots 30 and 31 through which respective tabs 32 and 33 can pass to be loosely fitted and secured to the end plates using staples. A hose connection 39 enables the bag to be inflated and deflated via hose 40.

It will be appreciated that the present invention provides a free standing inflatable bag of simple construction that can act directly on a load and can elevate loads to relatively high angles at relatively low capacity. In addition, the life of the bag has been optimised by reducing the chance of failure at the seams.

Whilst the above has been given by way of illustrative example of the invention, many modifications and variations may be made thereto by persons skilled in the art without departing from the broad scope and ambit of the invention as set forth in the appended claims.

I claim:

1. A combination of a dump tray, an inflatable bag and a base suitable for a dump vehicle, comprising hinge means connecting the dump tray to the base to constrain the tray's movement, the inflatable bag being located between the tray and the base, such that on inflation of the bag, the base remains stationary relative to the tray and the tray is moved about the hinge means, the bag being constructed such that when fully inflated it assumes an oblique cone-like shape with a side wall defined between a rounded apical end wall and a rounded base end wall, said apical end wall and said base wall moving apart as the bag inflates to define a direction of travel of said end walls, the bag having first coupling means connecting the apical end wall to the tray and second coupling means connecting the base end wall of the bag to the base.

2. The combination according to claim 1 wherein the side wall is made from a material having reinforcement extending in two directions, the reinforcement having tension distribution properties such that during inflation of the bag tension in the material of said side wall, in the direction between the end walls is substantially in the direction of travel of said end walls thereby reducing tendency of the bag to rotate as it inflates.

3. The combination according to claim 1 wherein the bag is coupled to the base so as to allow limited movement of the base end wall of the bag relative to the base as the bag inflates.

4. A kit for fitting a vehicle chassis with an exhaust powered dump tray, the dump tray being hingedly connected to the chassis, the kit including an inflatable bag and load transmitting end plates, the inflatable bag having a side wall and opposed rounded end walls which move apart as the bag inflates to define a direction of travel of said end walls, the bag being constructed so that when inflated it assumes an oblique cone-like shape, the load transmitting end plates being adapted to secure the bag between the dump tray and the chassis of the vehicle such that when the bag is fitted and inflated, the dump tray is raised and the bag tapers toward the dump tray.

5. The kit according to claim 4 wherein the side wall is made from a material having reinforcement extending in two directions, the reinforcement having tension distribution properties such that during inflation, tension in the material of said side wall in the direction between the end walls is substantially in the direction of travel of the end walls.

6. The kit according to claim 4 wherein the side wall is made from a side wall blank of flexible material and the opposed end walls are made from respective end wall blanks of flexible material, the side wall blank when laid out flat having opposed neck sections and opposed arcuate seam defining portions defining a medially bulged region between the opposed neck sections, the neck sections being joined by a longitudinally extending seam in the bag when inflated, the end wall blanks each having oval seam defining portions when laid out flat, the seam defining portions of the respective end wall blanks being joined to the respective seam defining portions of the side wall blank by respective circumferential seams located adjacent the respective end walls of the bag.

7. An inflatable bag for lifting a load wherein the bag is constructed so that when fully inflated, it assumes an oblique cone-like shape, said bag having a side wall defined between a rounded apical end wall and a rounded base end wall.

8. An inflatable bag according to claim 7 wherein the side wall is made from a side wall blank of flexible material, each end wall being made from an end wall blank of flexible material, the side wall blank when laid out flat having opposed neck sections and opposed arcuate seam defining portions defining a medially bulged region between the opposed neck sections, the neck sections being joined by a longitudinally extending seam in the bag when inflated, the end wall blanks each having oval seam defining portions when laid out flat, the respective end wall blanks having their respective seam defining portions joined to the respective seam defining portions of the side wall by respective circumferential seams.

9. An inflatable bag according to claim 7, which is adapted for use with a dump vehicle and further comprises first coupling means connecting the apical end wall of the bag to a dump tray of the dump vehicle and second coupling means connecting the base end wall of the bag to a base of the dump vehicle.

10. An inflatable bag according to claim 9, and further comprising load transmitting end plates adapted to secure the bag between the dump tray and a chassis of the vehicle such that when the bag is fitted to the chassis and inflated, the dump tray is raised and the bag tapers toward the dump tray.

* * * * *